United States Patent
Fong (10) Patent No.: US 11,642,697 B2
(45) Date of Patent: May 9, 2023

(54) ULTRASONIC TRANSDUCER

(71) Applicant: Guided Ultrasonics Ltd, London (GB)

(72) Inventor: Jimmy Fong, London (GB)

(73) Assignee: Guided Ultrasonics Ltd, London (GB)

( * ) Notice: Subject to any disclaimer, the term of this patent is extended or adjusted under 35 U.S.C. 154(b) by 249 days.

(21) Appl. No.: 16/753,271

(22) PCT Filed: Nov. 6, 2018

(86) PCT No.: PCT/GB2018/053214
§ 371 (c)(1),
(2) Date: Apr. 2, 2020

(87) PCT Pub. No.: WO2019/092410
PCT Pub. Date: May 16, 2019

(65) Prior Publication Data
US 2020/0331028 A1  Oct. 22, 2020

(30) Foreign Application Priority Data

Nov. 10, 2017  (GB) ..................................... 1718581

(51) Int. Cl.
*B06B 1/06* (2006.01)
(52) U.S. Cl.
CPC .................................. *B06B 1/0685* (2013.01)
(58) Field of Classification Search
CPC ............... B06B 1/0685; B06B 1/0644; G01N 29/2437; G01N 29/32; G01N 29/24; G01N 29/28
USPC ....................................................... 310/334
See application file for complete search history.

(56) References Cited

U.S. PATENT DOCUMENTS

| | | | |
|---|---|---|---|
| 3,794,866 A | 2/1974 | McElroy et al. |
| 5,016,474 A | 5/1991 | Hazony et al. |
| 2004/0000838 A1 | 1/2004 | Toda |
| 2012/0006132 A1 | 1/2012 | Faucher et al. |
| 2013/0074602 A1 | 3/2013 | Jackson |
| 2013/0127296 A1 | 5/2013 | Pavlakovic |
| 2014/0292148 A1 | 10/2014 | Nakamura |

FOREIGN PATENT DOCUMENTS

| | | |
|---|---|---|
| EP | 1394538 A1 | 3/2004 |
| GB | 2403011 A | 12/2004 |
| GB | 2479744 A | 10/2011 |
| JP | 60-159645 A | 8/1985 |
| JP | 7-312799 A | 11/1995 |

(Continued)

OTHER PUBLICATIONS

International Preliminary Reporton Patentability for Application No. PCT/GB2018/053214, dated May 22, 2020, 13 pages.

(Continued)

*Primary Examiner* — Daniel L Murphy
(74) *Attorney, Agent, or Firm* — McCarter & English, LLP (57) ABSTRACT

An ultrasonic transducer is disclosed. The transducer includes a wear cap and an active element. The wear cap includes at least one slot arranged so as to define a strip. The strip is arranged to be in vibrational communication with the active element. The ultrasonic transducer may include a rigid block. The active element may be interposed between the wear cap and the rigid block, and the rigid block may be configured to provide a backing mass for the active element. Optionally, the rigid block may include chamfered edges.

15 Claims, 6 Drawing Sheets

(56) References Cited

FOREIGN PATENT DOCUMENTS

| JP | 11-146492 A | 5/1999 |
|----|-------------|--------|
| JP | 2014-198197 A | 10/2014 |
| WO | 1996/12951 A1 | 5/1996 |
| WO | 2007/125308 A2 | 11/2007 |
| WO | 2011/131954 A2 | 10/2011 |
| WO | 2017/058244 A1 | 4/2017 |

OTHER PUBLICATIONS

Invitation to Pay Additional Fees for Application No. PCT/GB2018/053214, dated Jan. 30, 2019, 11 pages.
International Search Report and Written Opinion for Application No. PCT/GB2018/053214, dated Jun. 6, 2019, 17 pages.
United Kingdom Combined Search and Examination Report for Application No. GB1718581.0, dated May 4, 2018, 8 pages.
Japanese Office Action for Application No. 2020-525909, dated Oct. 11, 2022, 15 pages.

ULTRASONIC TRANSDUCER

CROSS-REFERENCE TO RELATED APPLICATIONS

This application is a 35 U.S.C. § 371 national stage filing of International Application No. PCT/GB2018/053214, filed on Nov. 6, 2018, which claims priority to United Kingdom Patent Application No. 1718581.0, filed on Nov. 10, 2017. The entire contents of each of the aforementioned applications are incorporated herein by reference.

FIELD OF THE INVENTION

The present invention relates to an ultrasonic transducer, particularly, but not exclusively, for use in inspecting pipes using guided ultrasonic waves.

BACKGROUND

Ultrasonic waves can be used for inspecting a structure, such as a pipe, to identify defects and flaws within the structure. Examples of ultrasonic inspection devices can be found in WO 96/12951 A, WO 2007/125308 A2 and EP 1 394 538 A1.

WO 96/12951 A describes apparatus for inspecting elongate members, such as pipes. The apparatus includes a ring of angularly-spaced transducers (or "exciters") clamped to the outside wall of a pipe. Each transducer includes a piezoelectric element, a metal block adhesively bonded to the piezoelectric element, and a thin faceplate shim secured to the face of the piezoelectric element to provide a wear plate.

WO 2011/131954 A2 describes an improved ultrasonic transducer which includes a wear plate, a piezoelectric element arranged rearwards of the wear plate and a rigid block arranged rearwards of the piezoelectric element and which is configured to provide a backing mass for the piezoelectric element. The wear plate extends across the piezoelectric element and rearwards so as to provide a cap over the piezoelectric element and sides of at least a forward portion of the rigid block.

SUMMARY

According to a first aspect of the present invention there is provided an ultrasonic transducer. The transducer includes a wear cap and an active element (such as a piezoelectric element). The wear cap includes at least one slot arranged to define a strip and the strip is configured to be in vibrational communication with the active element.

Thus, the wear cap can be displaced further for a given force and so result in a greater excitation for a given input signal and in a greater output signal for a given received.

The wear cap may include a single 'U'-shaped slot such that the strip is cantilevered.

The wear cap may include at least two slots including first and second slots arranged to define the strip between the first and second slots. Preferably, the wear cap includes two slots.

An outward facing surface of the strip may be flat between the slots. Alternatively, a portion of an outward facing surface of the strip may project outwardly. For example, the outward facing surface of the strip may project outwardly to provide a blunt ridge, or to provide a knife edge or sharp ridge.

The strip is preferably runs in a direction within 45° of an axis of polarisation of the active element. For example, the strip may run parallel or substantially parallel to the axis of polarisation of the active element.

The ultrasonic transducer may further comprise a rigid block, wherein the active element is interposed between the wear cap and the rigid block, and the rigid block is configured to provide a backing mass for the active element.

The rigid block has a top face, a bottom face and side faces. Edges between adjacent side faces may be chamfered. The rigid block may have chamfered edges between the side faces. Edges between each side face and the bottom face may be chamfered. The rigid block may have chamfered edges between each respective side face and the bottom face. The width of chamfering may vary along the edge(s). For example, the chamfering may taper. The chamfering may become narrower along the edge from one end to the other.

According to a second aspect of the present invention there is provided an ultrasonic transducer. The transducer includes a wear cap, a piezoelectric element and a rigid block. The rigid block has a top face, a bottom face and side faces. Edges between adjacent side faces are chamfered and/or edges between each side face and the bottom face are chamfered.

Thus, the chamfering can help to make it harder to excite resonant modes.

Width of chamfering may vary along the edge(s). For example, the chamfering may taper.

BRIEF DESCRIPTION OF THE DRAWINGS

Certain embodiments of the present invention will now be described, by way of example, with reference to the accompanying drawings, in which.

DETAILED DESCRIPTION OF CERTAIN EMBODIMENTS

Referring to FIGS. 1 to 7, an ultrasonic transducer assembly 1 (herein simply referred to as an "ultrasonic transducer") is shown.

Figure 1:
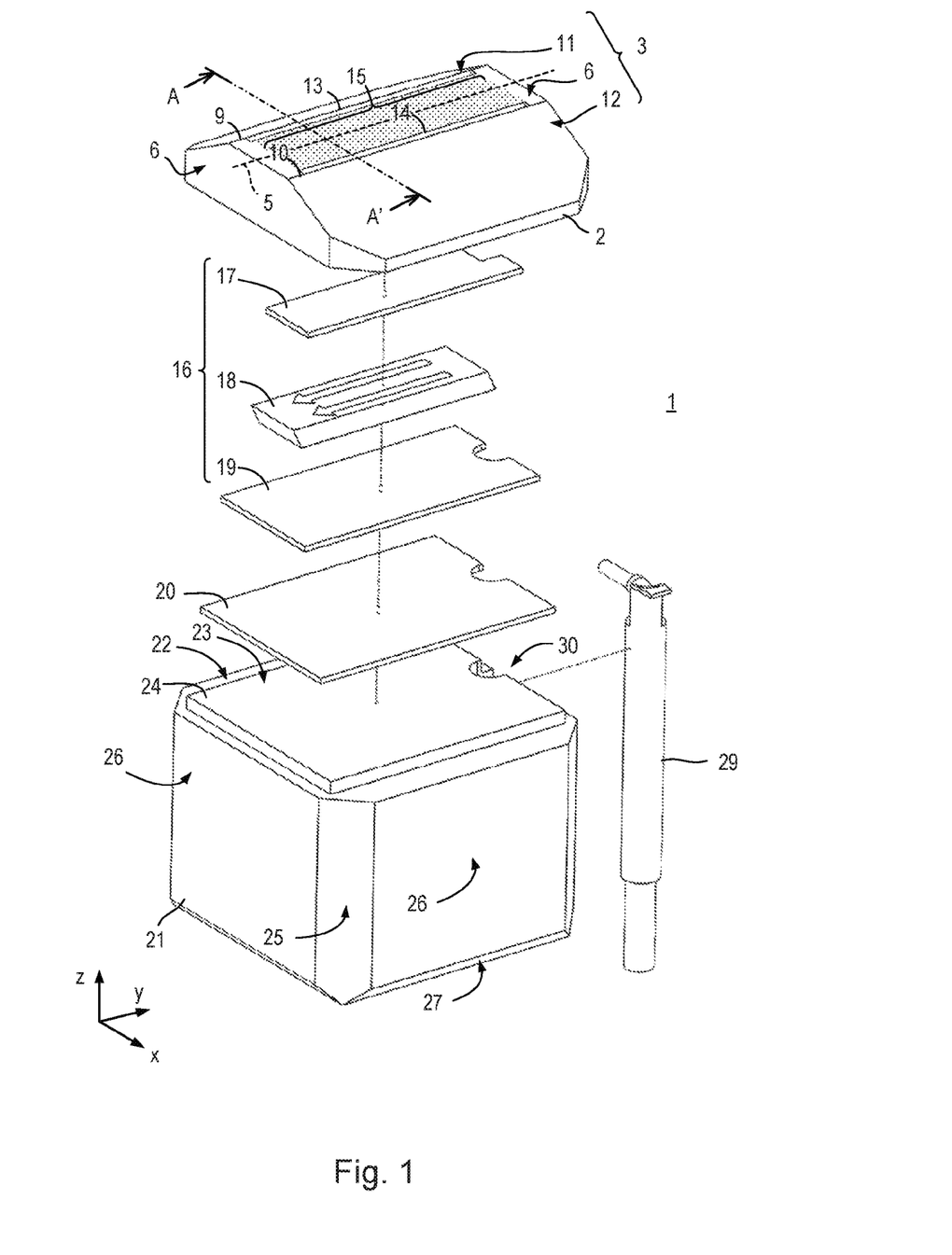
FIG. 1 is an exploded perspective view of an ultrasonic transducer assembly.
Figure 2:
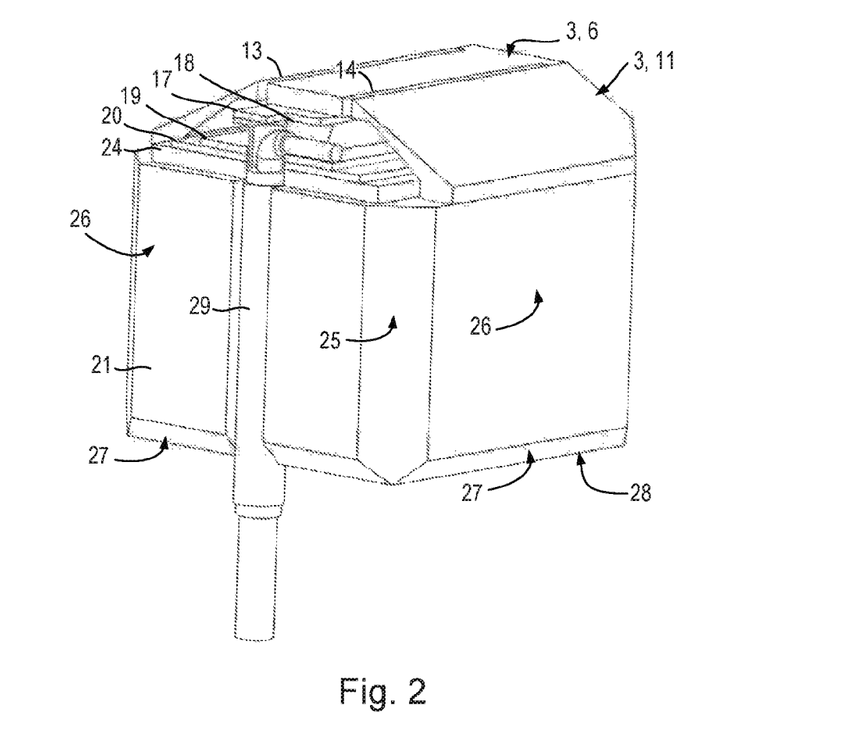
FIG. 2 is a part cutaway perspective view of the ultrasonic transducer assembly shown in FIG. 1.
Figure 3:
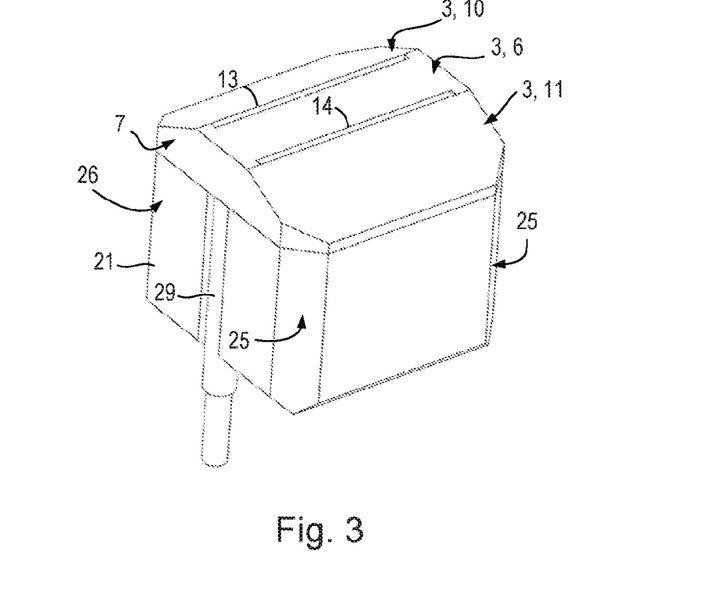
FIG. 3 is a perspective view of the ultrasonic transducer assembly shown in FIG. 1.
Figure 4:
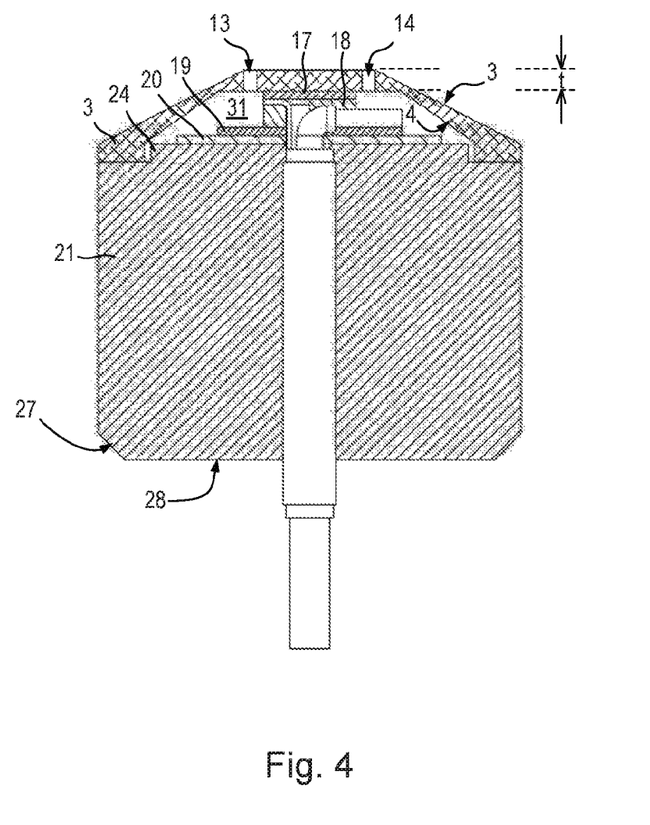
FIG. 4 is a cross sectional view of the ultrasonic transducer shown in FIG. 1 taken along the line A-A'.
Figure 5:
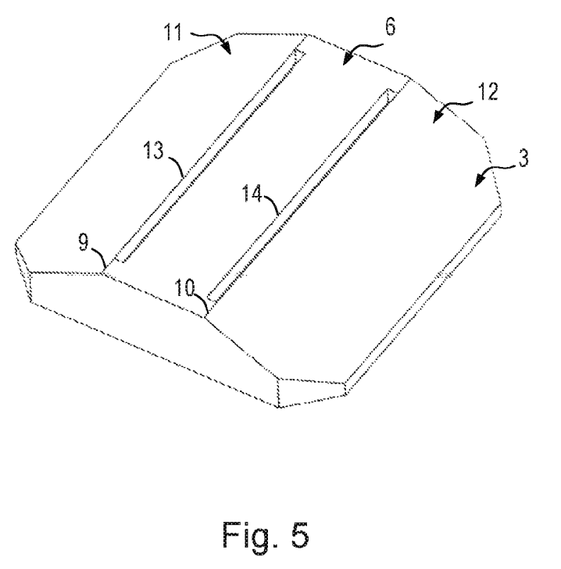
FIG. 5 is a perspective view of a wear plate having a double slit from above.
Figure 6:
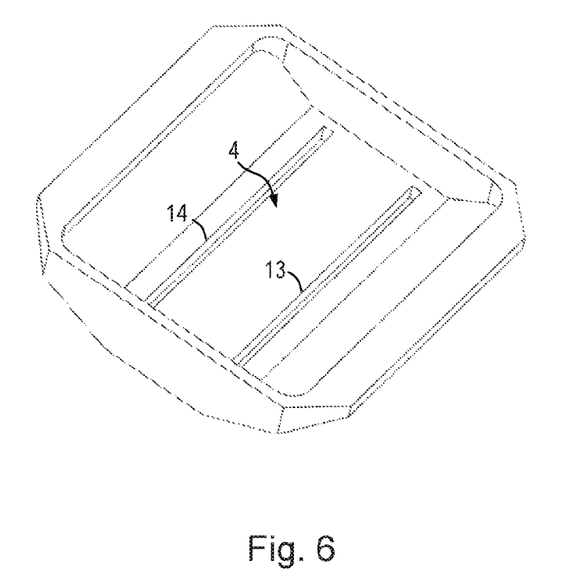
FIG. 6 is a perspective view of a wear plate having a double slit from below.

The ultrasonic transducer 1 includes a wear cap 2 (which may also be referred to as a "wear plate", "face plate" or "contact head") having a front surface 3 (or "outward facing surface") which, in use, is pressed into contact with an object or structure (not shown) under inspection, and a rear surface 4 (FIG. 4). The wear cap 2 is made from a ceramic, such as zirconium dioxide ($ZrO_2$) or aluminium oxide ($Al_2O_3$), or other suitable material.

The front surface 3 of the wear cap 2 generally has the shape of a frusto-triangular prism having a centre line 5 and comprising a central, flat surface portion 6 running between first and second ends 7, 8 and having first and second sides 9, 10, and first and second side, sloping surface portions 11, 12.

The wear cap 2 includes first and second notches 13, 14 (or "slots") running along the first and second sides 9, 10 of the flat surface 6 which stop short of the ends 7, 8. The slots 13, 14 can be formed by a suitable machining process, such as laser machining. The slots 13, 14 pass through the wear cap 2, i.e. between the front and rear surfaces 3, 4. The slots 13, 14 define a strip 15 (shown shaded to aid clarity) which is suspended between the ends 7, 8 and is afforded greater freedom to move, i.e. the slots 13, 14 increases the flexibility (or "compliance") of the portion of the wear cap 2 through which excitations pass. Expressed differently, the wear cap 2 can be displaced further for a given applied force. The strip 15 generally runs in the same direction as the polarity of an active layer.

The ultrasonic transducer 1 includes a transducer stack 16 which comprises an earth electrode 17 which is closest to the wear cap 2, an active layer 18 in the form of a shear polarized piezoelectric layer and a signal electrode 19. The active layer 18 is sandwiched between the electrodes 17, 19. A second transducer stack may be included, as described, for example, in WO 20011/131954 A2 ibid. which is incorporated herein by reference.

An electrically-insulating layer 20 separates the transducer stack 16 from a rigid block 21 which provides a non-resonant backing mass. The rigid block 21 is preferably made of steel or other dense material so as to provide a high mass. The material may be chosen so as to have a low coefficient of thermal expansion or one which is matched to the wear plate 2.

Figure 7:
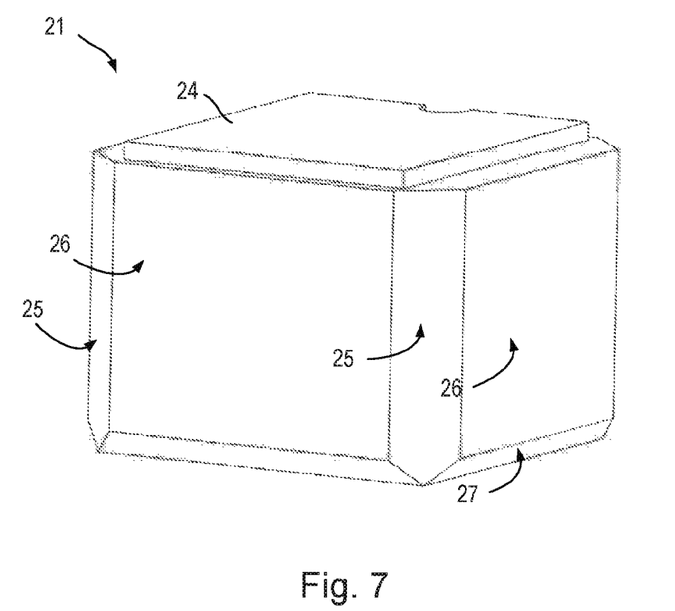
FIG. 7 is a perspective view of a backing mass having chamfered edges and which generally has a uniform cross-sectional area between a front and a back.

Referring also to FIG. 7, the rigid block 21 (herein referred to a "first rigid block" or "rigid block with uniform chamfers") includes a recessed edge 22 around the top 23 of the block 21 thereby forming a mesa 24. The rigid block 21 includes chamfered side edges 25, i.e. chamfered edges between adjacent side faces 26. The block 21 includes chamfered bottom edges 27, i.e. chamfered edges between an adjacent side face 26 and the bottom face 28. As will be explained in more detail later, this can help to alter the resonant frequency of the backing mass 21.

Figure 8:
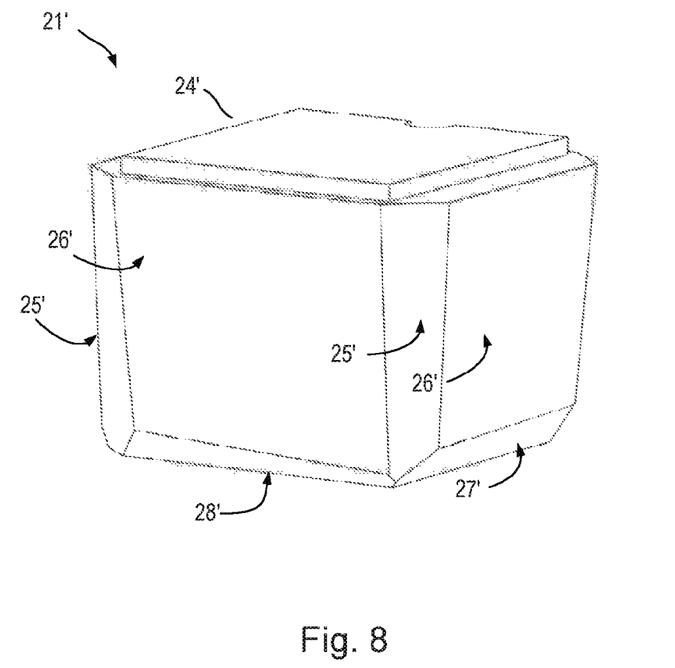
FIG. 8 is a perspective view of a backing mass having chamfered edges and which generally has a decreasing cross-sectional area between a front and a back.

Referring also to FIG. 8, another rigid block 21' (herein referred to a "second rigid block" or "rigid block with tapered chamfers") is shown. The second rigid block 21' can be used instead of the first rigid block 21 shown in FIG. 7.

The second rigid block 21' is similar to the first rigid block 21 except that the widths of the chamfered side edges 25' and/or the chamfered bottom edges 27' vary between the top 23' and bottom 28' of the block 21'. In particular, the width of the side chamfer becomes smaller towards the bottom 28' of the block 21'.

A miniature coaxial cable 29 provides an electrical connection to the signal electrode 20. The cable 29 sits in a semi-circular recess 30 running down the middle of one of the sides 25 of the rigid block 21.

The wear cap 2 is shaped to provide a space or recess 31 in which the transducer stack 16, the insulating plate 20 and a top part of the rigid block 21 sit. The wear cap 2 may be machined or moulded The wear cap 2 may have a thickness, t, of material equal to or greater than 1 mm or equal to or greater than 2 mm. As shown in FIG. 4, the thickness, t, is behind the point (or region) which comes into contact with the structure under test (not shown). In this example, the thickness t corresponds to the thickness in the middle of the wear cap 2.

In the example hereinbefore described, the wear cap 2 has a flat profile across the width and length of the strip 15 (i.e. along the x-axis and y-axis) and the strip 15 has a uniform thickness across the width and length. However, wear cap 2 can have other profiles.

Figure 11:
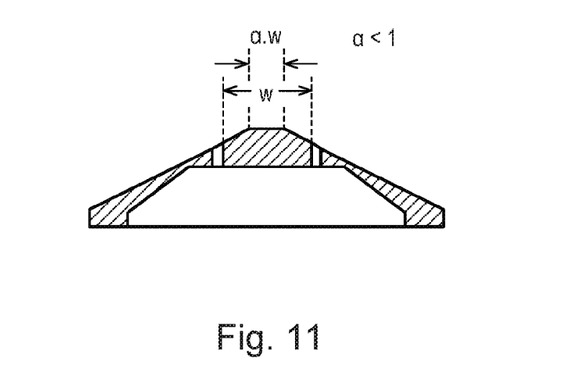
FIG. 11 is a cross sectional view of another wear cap having a reduced area-of-contact region.

Referring also to FIG. 11, a wear cap 2' is shown having a reduced area-of-contact profile, for example, the strip 15' has the shape of a frusto-triangular prism. For example, if the width w between the slots 13', 14' is w, then the width of a contact portion of the wear cap 2' has a width α.w, where α<1, for example, 0.5. A wear cap having a knife edge (not shown), such as that described in WO 2011/131954 A2 ibid. can be used. In the reduced area of contact, the wear cap 2 can be made thicker and so help to reduce heat transfer from a hot structure under test and the active element.

Referring in particular to FIG. 4, the rest of the space 31 (FIG. 4) is filled with a flexible filler (not shown), for example an epoxy adhesive or potting compound.

Referring still to FIGS. 1 to 6, the transducer 1 can be used in an apparatus or method for inspecting pipes as described in WO 96/12951 A and WO 2007/125308 A2 which are incorporated herein by reference.

Effect of the notches

The effect of the notches can be simulated using finite-element static analysis.

Figure 9:
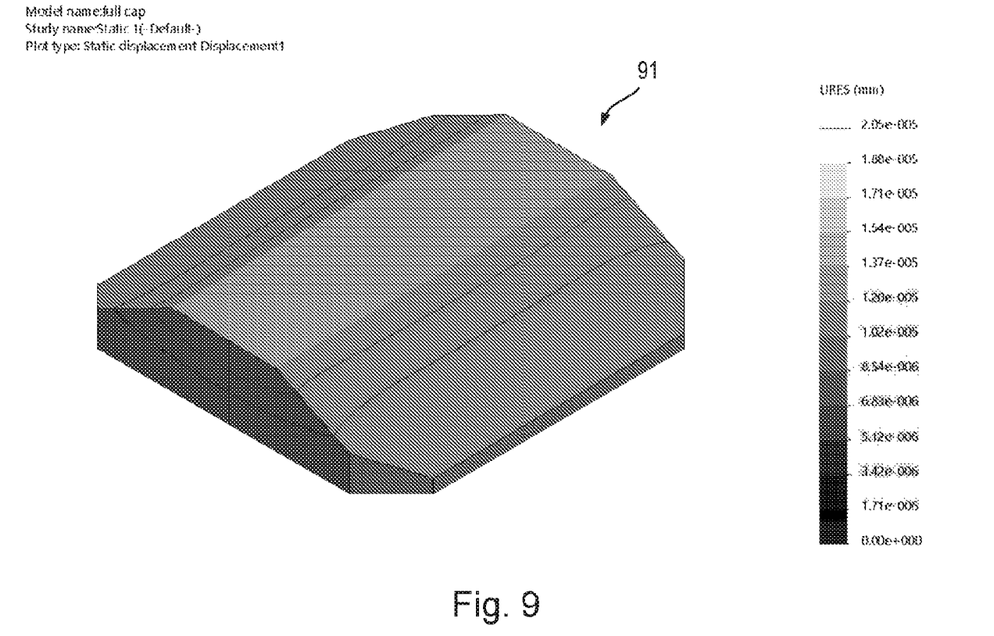
FIG. 9 is a computer model for a comparative example of a wear plate without a double slit.
Figure 10:
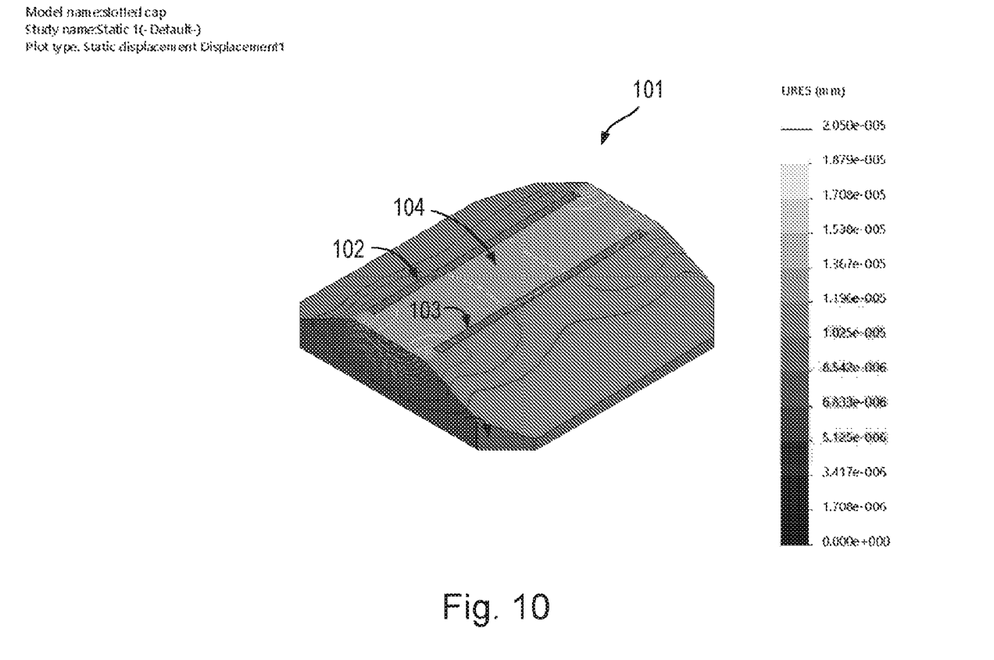
FIG. 10 is a computer model of a wear plate having a double slit.

Referring to FIGS. 9 and 10, wear caps 91, 101 with and without notches 102, 103 are simulated for applying a given force, in this case 1 N, to the rear surface of a cap over an area that is normally in contact with the active element. A lower surface of the cap (i.e. a rim) is fixed to represent the cap being in fixed contact with the backing mass.

FIG. 9 shows a computer simulation of displacement of a wear cap 91 not having notches.

FIG. 10 shows a computer simulation of a displacement of a wear cap 101 with first and second notches 102, 103.

A central part of the wear cap (e.g. central part 104) having notches can produce larger displacements. For the same applied force acting on the rear surface of a wear cap, a wear cap having notches can be displaced up to four times that of the same wear cap without notches. Consequently, using notches as herein described can help to improve signal-to-noise of received signals.

Effect of Chamfering

A transducer operates at frequencies below the first body resonance frequency. This usually depends on the longest dimension of the backing mass, namely diagonal distance between opposite edges. By introducing chamfering, this distance is reduced, thereby resulting in an increase in body resonance frequencies without significantly reducing the weight of the backing mass. To excite a resonance (strongly), the excitation by an active element matches the mode shape of the resonance to some extent.

Varying chamfering, for example as show in FIG. 8, so as to produce a backing mass having a non-symmetric shape can help to make it harder to excite a resonant mode due to mismatching of mode shape.

Thus, if the transducer is used close to resonance frequencies, it becomes less likely that these resonances will be excited, if at all.

Modifications

It will be appreciated that various modifications may be made to the embodiments hereinbefore described. Such modifications may involve equivalent and other features which are already known in the design, manufacture and use of ultrasonic transducers and component parts thereof and which may be used instead of or in addition to features already described herein. Features of one embodiment may be replaced or supplemented by features of another embodiment.

The slots need not be straight or even follow the same path. For example, each slot may be irregularly shaped.

There may be one slot having a 'U'-shape such that it defines a cantilevered slot respectively. There may be one slot having a 'H'-shape such that it defines two cantilevered slots.

There may be three or more slots, for example, defining two or more adjacent strips.

The slots may be filled with a filler (or "encapsulant") for example an adhesive (such as epoxy) or potting compound.

The wear plate may be coated with a protective film or layer, or have a cover formed from a plastics material.

The transducer may be operable outside ultrasonic frequencies. For example, the transducer may operate below 20 kHz, for instance as low as 5 to 6 kHz. The transducer may operate up to 100 kHz or more.

The rigid block may be omitted. Instead, the transducer may be held by a metallic band (not shown) which urges the transducer against the object or structure (not shown) being inspected.

Although claims have been formulated in this application to particular combinations of features, it should be understood that the scope of the disclosure of the present invention also includes any novel features or any novel combination of features disclosed herein either explicitly or implicitly or any generalization thereof, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

The invention claimed is:

1. An ultrasonic transducer including:
   a wear cap; and
   a piezoelectric element;
   wherein the wear cap includes at least two slots arranged to define a strip and the strip is arranged to be in vibrational communication with the piezoelectric element, and
   wherein the strip runs in a direction within 45° of the axis of polarization of the piezoelectric element.

2. The ultrasonic transducer of claim 1, wherein the wear cap includes at least two slots including first and second slots arranged to define the strip between the first and second slots.

3. The ultrasonic transducer of claim 1, wherein an outward facing surface of the strip is flat between the first and second slots.

4. The ultrasonic transducer of claim 1, wherein a portion of an outward facing surface of the strip projects outwardly.

5. The ultrasonic transducer of claim 4, wherein the outward facing surface of the strip extends outwardly to provide a knife edge or sharp ridge.

6. The ultrasonic transducer of claim 1, further comprising:
   a rigid block;
   wherein the piezoelectric element is interposed between the wear cap and the rigid block and the rigid block is configured to provide a backing mass for the piezoelectric element.

7. The ultrasonic transducer of claim 6, wherein the rigid block has a top face, a bottom face and side faces.

8. The ultrasonic transducer of claim 6, wherein the rigid block has first and second adjacent side faces, and wherein an edge between the first and second adjacent side faces is chamfered.

9. The ultrasonic transducer of claim 6, wherein the rigid block has a bottom face and a side face, wherein an edge between the side face and the bottom face is chamfered.

10. The ultrasonic transducer of claim 6, wherein the rigid block has an edge that is chamfered, and wherein a width of chamfering varies along the edge.

11. The ultrasonic transducer of claim 10, wherein the chamfering tapers.

12. The ultrasonic transducer of claim 1, wherein the wear cap comprises a ceramic.

13. An ultrasonic transducer including:
    a wear cap;
    an active element; and
    a rigid block;
    wherein the rigid block has a top face, a bottom face and side faces and wherein edges between adjacent side faces are chamfered and/or edges between each side face and the bottom face are chamfered, and
    wherein a width of chamfering varies along the edges.

14. The ultrasonic transducer of claim 13, wherein the chamfering tapers.

15. The ultrasonic transducer of claim 13, wherein the wear cap comprises a ceramic.

* * * * *